April 9, 1963  W. BRANDIN  3,085,135
HOSE AND FLEXIBLE TRANSMISSION SUPPORT
Filed Aug. 8, 1958
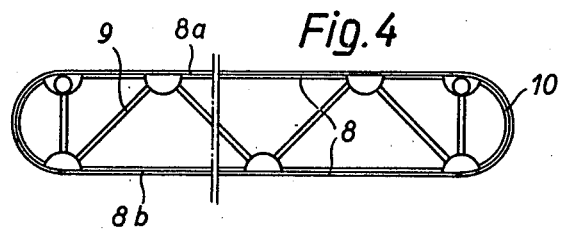
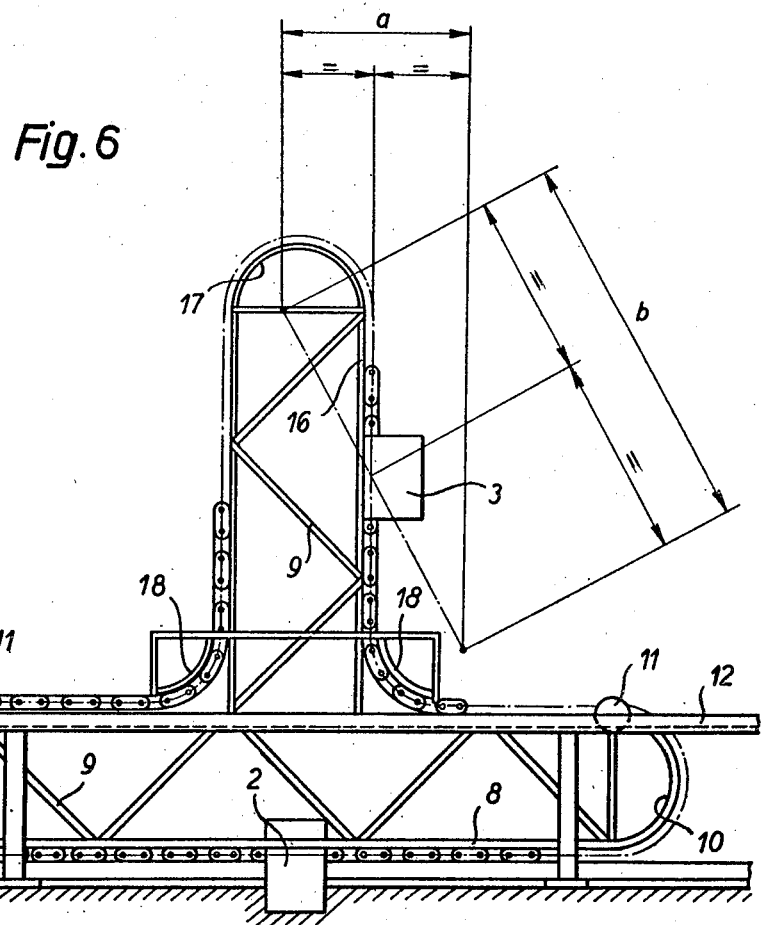
INVENTOR
Werner Brandin
BY
ATTORNEY

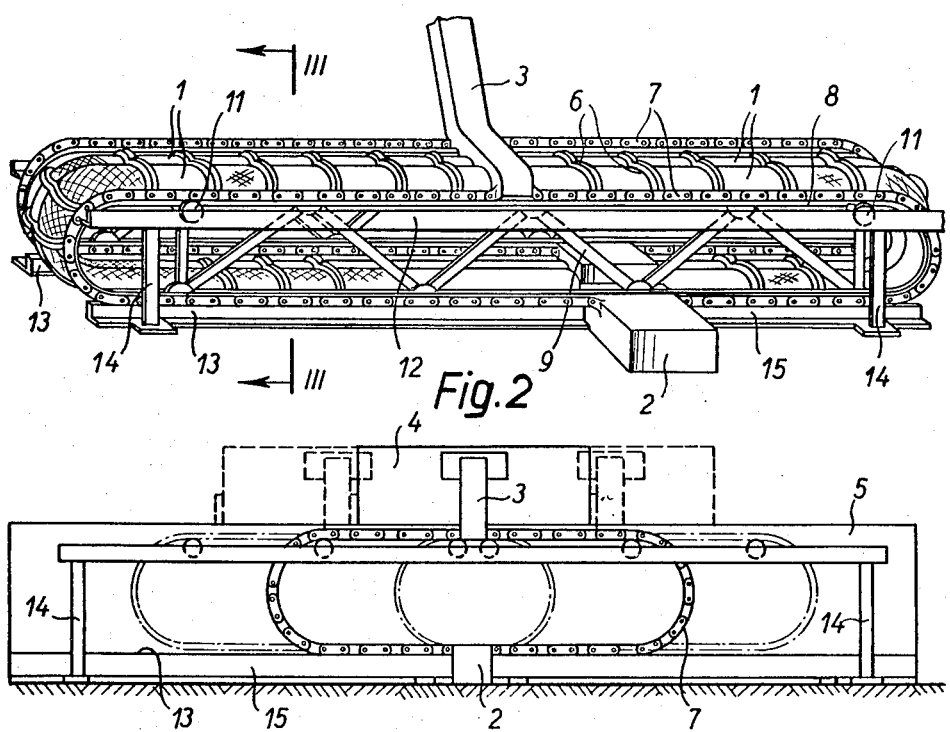
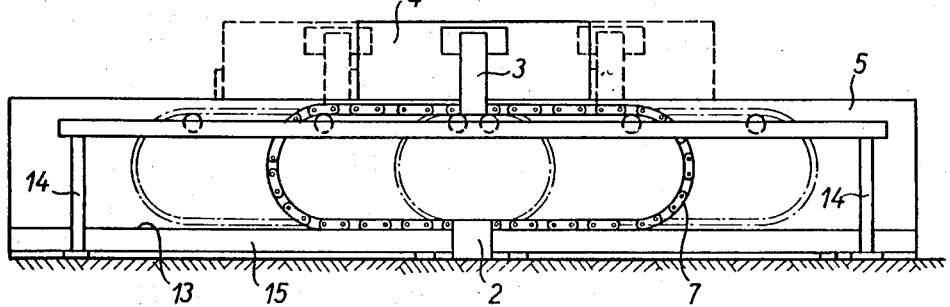
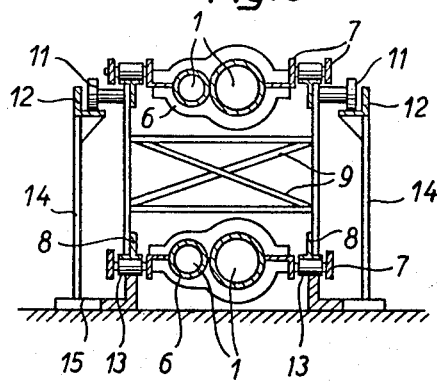

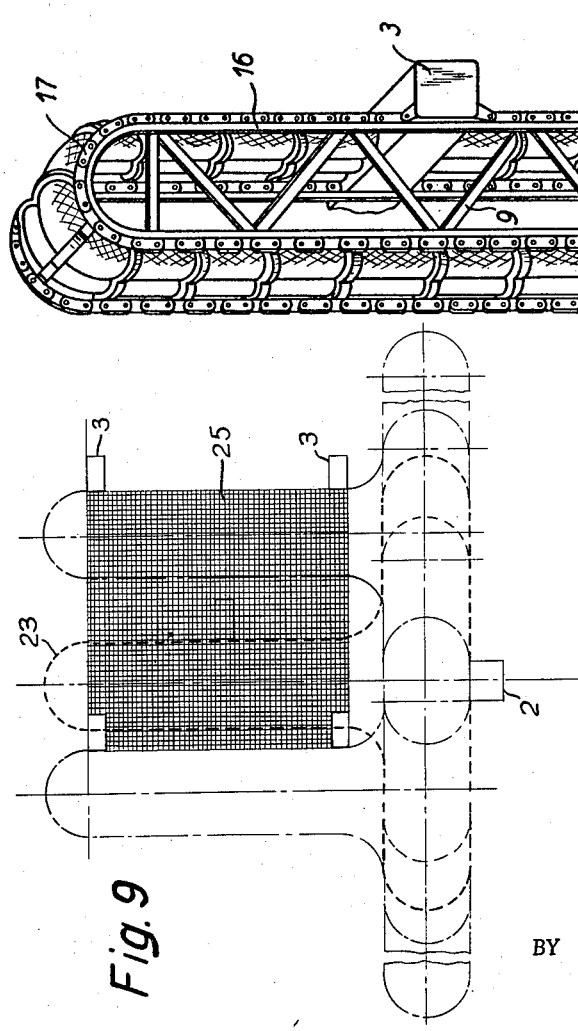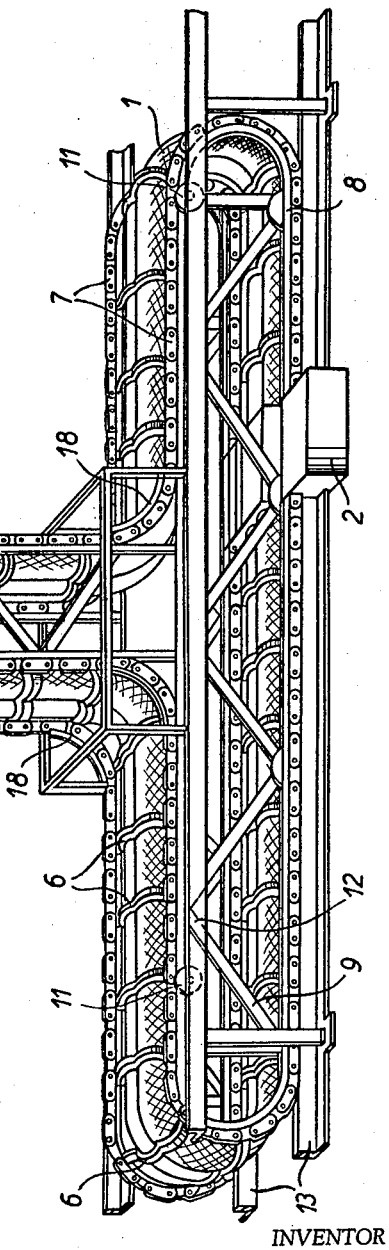

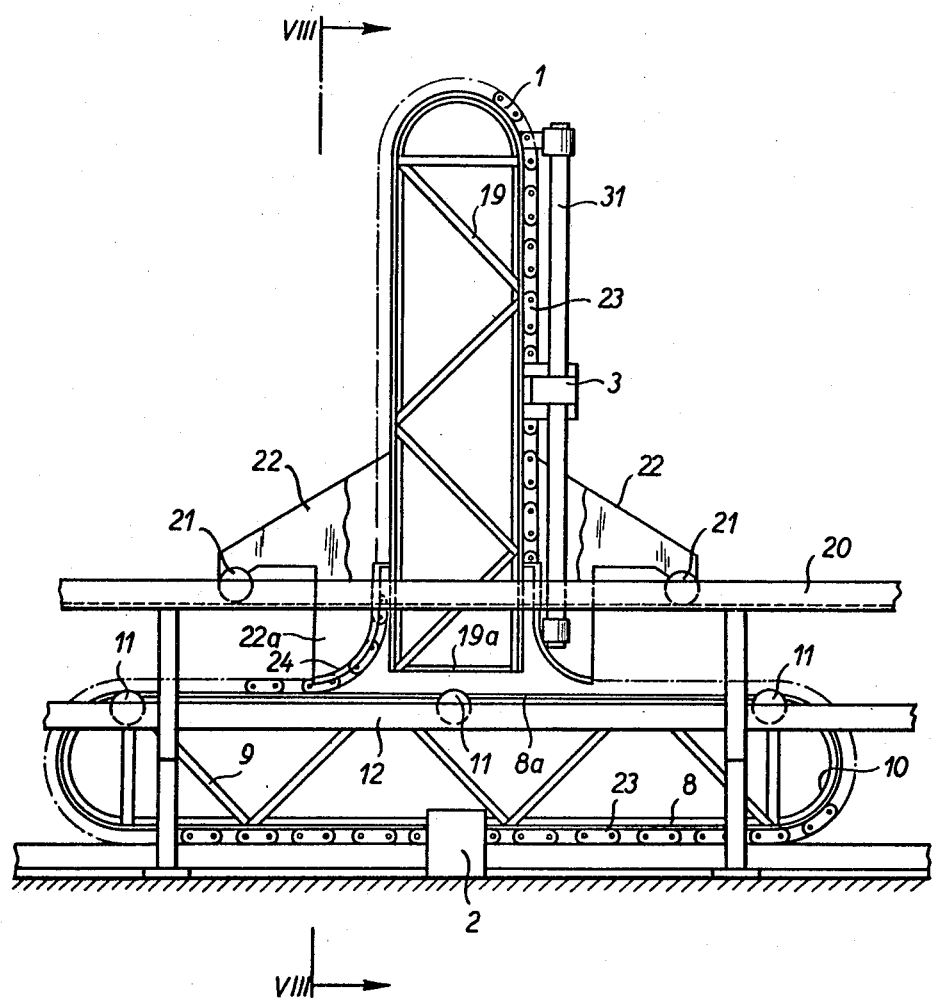

April 9, 1963 W. BRANDIN 3,085,135
HOSE AND FLEXIBLE TRANSMISSION SUPPORT
Filed Aug. 8, 1958 7 Sheets-Sheet 5

INVENTOR
Werner Brandin

BY *Robert E. Burns*
ATTORNEY

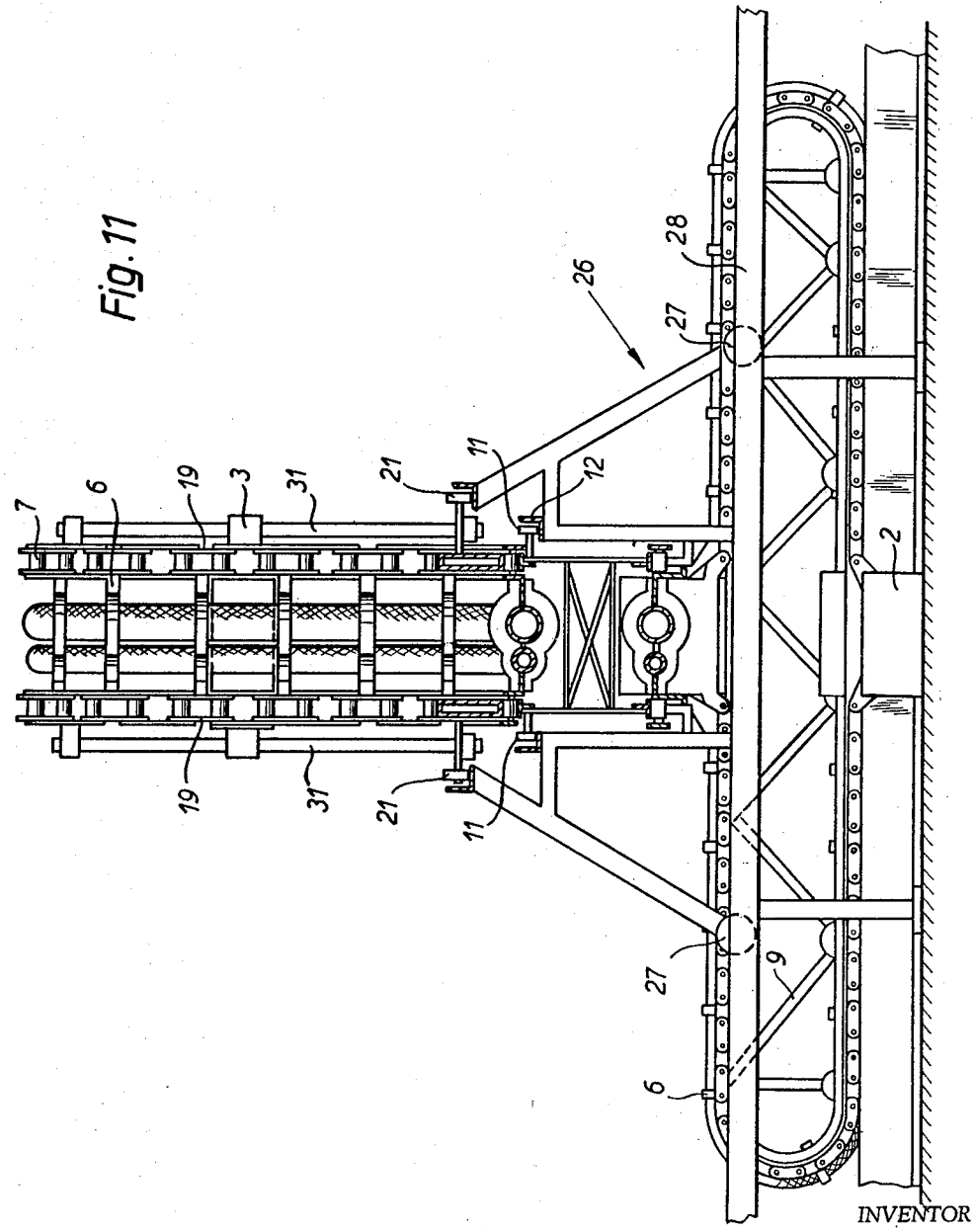

United States Patent Office 3,085,135
Patented Apr. 9, 1963

3,085,135
HOSE AND FLEXIBLE TRANSMISSION SUPPORT
Werner Brandin, Milan, Italy, assignor to Innocenti Soc. Gen. per l'Industria Metallurgica e Meccanica, Milan, Italy
Filed Aug. 8, 1958, Ser. No. 754,063
Claims priority, application Italy Aug. 10, 1957
1 Claim. (Cl. 191—12)

This invention relates to a device for supporting hoses and flexible transmissions for use in electric, pneumatic, hydraulic, oleodynamic and similar supply to a machine, adapted to connect two machine components which are stationary and movable, respectively, along a path or over a plane or within a given space.

The improved device is more particularly suitable for supporting cables or conduits for supplying machine tools, such as for feeding a movable carriage on its bench, but can be used for any other machine or plant, such as a crane or welding equipment on a building site.

Various devices are known for this purpose, but such prior devices can be used successfully only in given cases in which the stroke is of a limited length, generally extending in a horizontal or vertical direction, or with limited loads.

Among such devices hanging sheaths of catenary form, pulleys, self-supporting chains, and, in electric supply, stationary leads over which shoes attached to the movable member to be fed (trolleys, pantographs or the like) are movable may be mentioned. Among such known devices hanging sheaths of catenary form and pulley arrangements are more particularly suitable for vertical movements but less suitable for horizontal movements, above all when the horizontal stroke exceeds the available height for the sheath. The self-carrying chains are unsuitable for hoses of considerable weight and are operative with rectilinear motion only.

Devices embodying stationary leads and movable shoes are useful only in electric supply and in addition thereto suffer from the well known dangers arising from the fact that the leads should necessarily be left bare. Moreover, they are unsuitable for transmitting high intensity current.

This invention provides a supporting device which avoids the abovementioned drawbacks. More particularly the invention provides a supporting device for hoses and flexible transmissions, in which the travel of the movable end thereof may be of considerable length and arranged at will in the space.

A further object of this invention is to provide a device of the abovementioned type suitable for supporting hoses and flexible transmissions, which is only of limited strength and flexibility, making it unsuitable for absorbing traction, pressure and bending stresses, or bending through angles of very small radius.

The improved supporting device comprises at least one chain closed in loop form, anchored at one region thereof to a stationary component and at another diametrical region to a movable element, the chain being mounted on a movable carriage provided with guides therefor, the guides being of a configuration such as to hold the chain taut during travel of the carriage, rails for said carriage and supports for the hose of the flexible transmission secured to the chain links.

Further characteristic features of this invention will be understood from the appended description referring to the accompanying drawings given by way of example only, wherein:

FIGURE 1 is a perspective view of a first embodiment of this invention,

FIGURE 2 is a diagrammatical elevational side view of the device shown in FIGURE 1 in the various operative positions, FIGURE 3 is a side view of the device shown in FIGURE 1, FIGURE 4 is an elevational view of the carriage, FIGURE 5 shows a first modification of the invention more particularly for use when the movable member moves along a path inclined to the horizontal.

FIGURE 6 is an explanatory diagram of FIGURE 5.

FIGURE 7 is an elevational side view of a further embodiment of the invention.

FIGURE 9 is an explanatory diagram of the operation of the modified construction shown in FIGURE 7.

FIGURE 11 is a cross-sectional view of the device shown in FIGURE 10.

Figure 8:
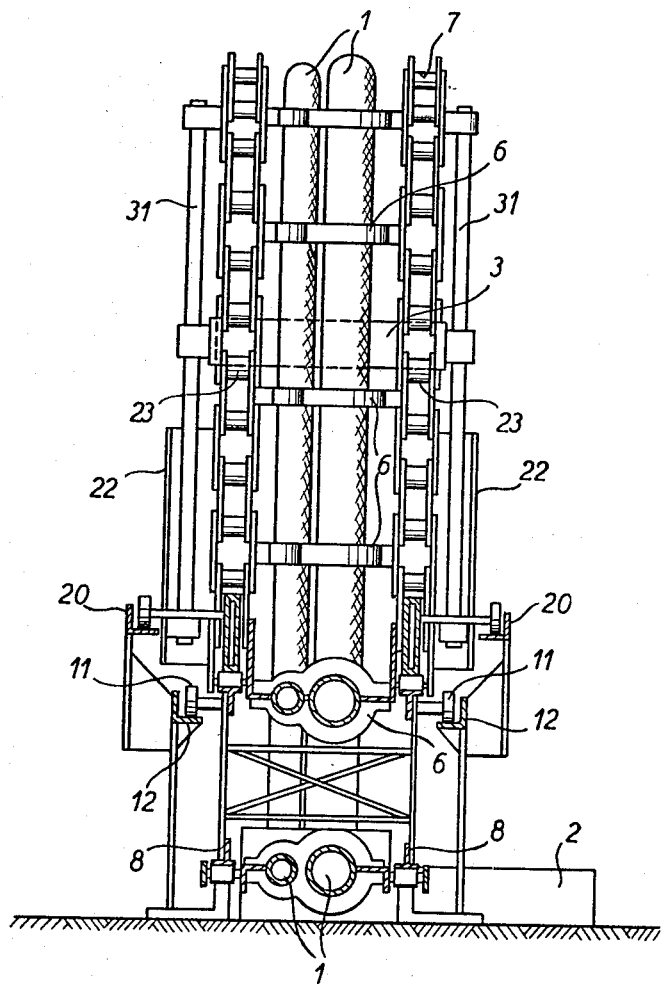
FIGURE 8 is a cross-sectional view of the device shown in FIGURE 7.

In the various figures corresponding components are denoted by the same reference numerals. On the drawings 1 denotes the hose or flexible transmission such as electric cables, hose for compressed air, water or oil, chains, flexible shafts and the like, generally elongated members of a more or less flexible nature or unsuitable for absorbing traction, external pressure, bending stresses or for bending under a small radius and the like. Such hose or flexible transmisison has one end thereof connected to a stationary component 2, their other end being connected to a member 3 movable along a horizontal line in the embodiments shown in FIGURES 1 to 4.

The flexible members are adapted to feed the movable members, such as the carriage of the machine 4 (FIGURE 2) when said carraige is capable of a horizontal translational movement over a base 5. In this case the stationary and movable members 2 and 3 can be the terminal board or junction boxes for electrical, pneumatic, hydraulic connections, etc. for the hose or flexible transmission 1 adapted to feed the carriage 4.

The flexible members 1 are supported by cross members 6 connected at their ends to chains e.g. roller chains 7 closed in loop form and anchored at one region to the stationary component 2 and at another diametrical region to the movable member 3. The rollers of the chains 7 slide on rails 8 interconnected by cross members 9 (compare FIGURES 4, 6, 7 and 10) to form an undeformable structure. Guides or rails 8 situated in the same vertical plane are interconnected at their ends by semi-circular members 10 securedly fixed thereto.

During movement of the movable element 3 the chains slide along their respective guides. It is essential for a satisfactory operation of the device for the guide development to substantially equal the chain length, so that the latter cannot slacken during movement thereof.

The carriage comprising guides 8—10 and cross members 9 is fitted with lateral castors 11 rolling over stationary rails 12.

The lower runs of the chains 7 are supported by stationary guides 13. In the embodiment shown in FIGURE 2 the rails 12 are supported on the floor by means of legs 14, the stationary guides 13 being supported by smaller legs 15. It will be seen that the supporting device may be embedded in the floor or supported overhead on pillars. Alternatively it can be arranged vertically instead of horizontally, or at any desired inclination to afford displacement of the movable member 3 in a vertical or any inclined direction.

The rails 13 and guides 8 may be manufactured from welded structural members available in the trade.

Sheet metal shields can be arranged around the device as protection against external agents (dust, fall of articles etc.). Such shield may be sealed if required. The rails 12 are not necessarily rectilinear but may be of other shape such as corrugated to afford undulatory movements of the member 3.

In its simplest embodiment as shown by FIGURES 1 to 4 the carriage comprises four parallel members 8 serving at the same time as chain guides, arranged along the edges of a rectangular prism. The members 8 may be other than straight, such as inclined in a vertical or horizontal plane to afford various movements of the movable members.

When the movable member 3 should be displaceable along a plane inclined to the carriage path, other constructions are resorted to, such as the one shown in FIGURES 5 and 6, in which the carriage is of inverted T configuration, as can be derived from the carriage shown in FIGURES 1 to 4, by adding vertical guides 16 thereto, which merge at the top into arcuate members 17.

In order to hold the chains close to the guides throughout the carriage 5 auxiliary guides 18 are employed, which are of arcuate shape and arranged at the connection betion the flanges and web of the inverted T.

It will be seen from FIGURE 6 that, assuming $a$ to denote a given carriage travel, the box or movable element 3 moves in this case over a path $b$ inclined to the horizontal, having a horizontal component which is twice the vertical component.

By varying the inclination of the guides 16 with respect to the guides 8 any inclination of the rectilinear path $b$ can be obtained. The structure disclosed above can be usefully applied in various machines, such as boring, milling or copying machines for working metals. In such cases the working tool is supported by the movable member 3 and is driven by a motor located therein.

In a modification of the structure shown in FIGURES 5 and 6, the carriage, being of inverted T-configuration, comprises two members movable independently of each other. The first of said members comprises guides 8 and 10 and cross members 9 and is similar to the carriage shown in FIGURES 1 to 4, and is fitted, like the latter, with lateral casters 11 rolling over stationary horizontally extending rails 12. The other member has the form of an upstanding, preferably vertically arranged carriage 19 located above said first member. It bears on the rails 20 by means of casters 21 rotatably supported in lateral brackets 22 fast with the carriage structure.

The longitudinal axes of the carriage 19 and carriage 8—9—10 are perpendicular to each other, the carriage 19 being arranged with a smaller side 19a adjacent a long side 8a on the carriage 9. The chains referred to as 23 are guided around both carriages and are guided from one carriage to the other by auxiliary arcuate guides 24 secured to straps 22a on the brackets 22. The guides 24 may be in the form of a rotatable wheel if so required by the construction.

In the latter case the movable element 3 is displaceable along any path situated in the hatched plane 25 through the relative freedom of movement of the carriages 8 and 19.

Figure 10:
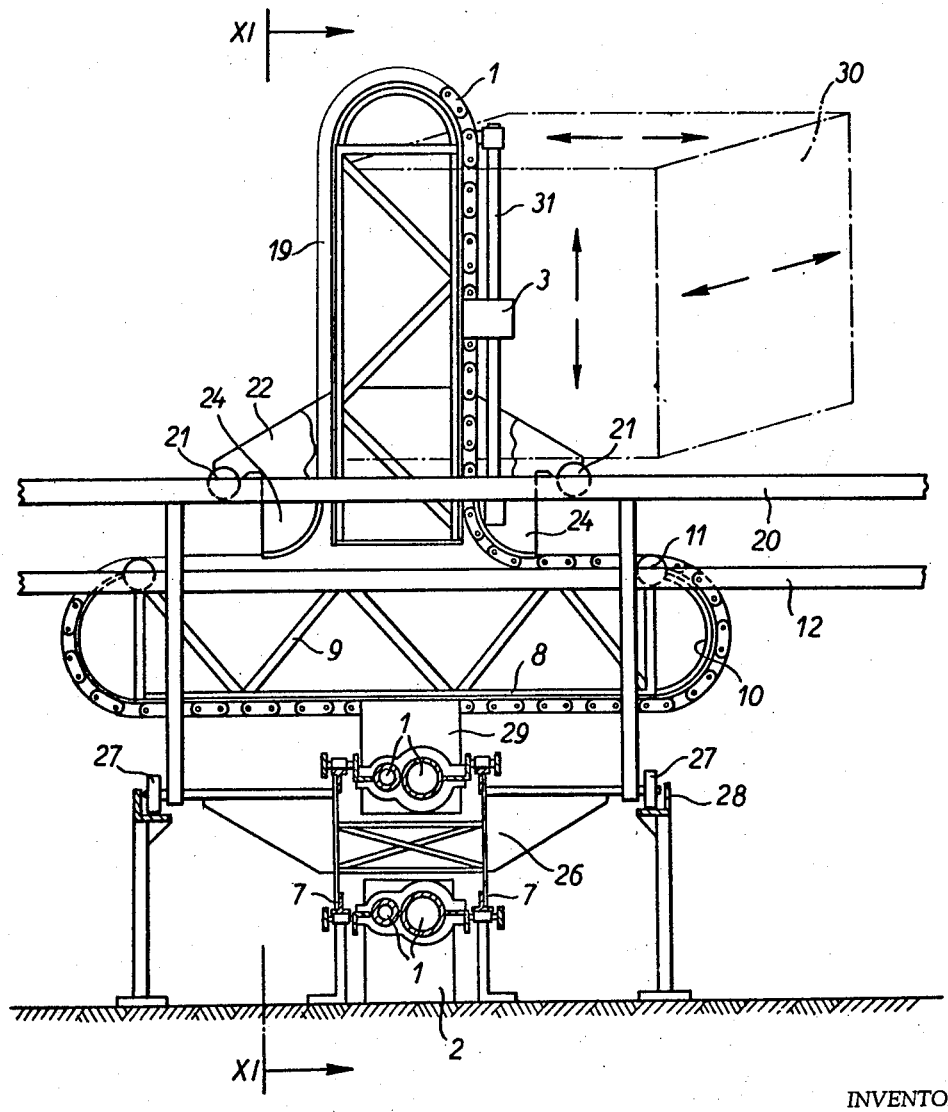
FIGURE 10 shows a further modification of the invention, more particularly for use when the movable member moves along any desired path in the space.

The embodiment shown in FIGURES 7 to 9 is more particularly useful when the movable member 3 moves along lines situated in a vertical plane. Such construction may be improved by providing suitable guide rails, such as rails 31 (FIG. 7), for the movable member, extending parallel to the carriage 19 and secured thereto. This will be useful in the case in which both carriages are located in a plane inclined to the vertical plane, or in a horizontal plane. The structure above disclosed can be employed in the cases mentioned with reference to the structure shown in FIGS. 5 and 6. However, it will appear more useful than the latter, on account of the fact that the tool-carrying movable member can be displaced along a path of any desired shape provided said entire path is arranged in one plane.

Where the movable member moves along any desired path in a space, the embodiment shown in FIGURES 10 and 11 is advantageously employed.

The structure shown in FIGURES 7 to 9 is then assembled on a supporting device denoted as a whole by 26 in FIGS. 10 and 11, substantially similar to the device shown in FIGURES 1 to 4, supported by wheels 27 rolling over rails 28 arranged with their axis orthogonal to the axis of the rails 12 and 20.

The movable member 29 of the device 26 acts as a stationary component for the chains supported by the carriages 8—19. The movable member 3 is therefore displaceable along any desired path in a cubic space shown in axonometric perspective view at 30 in FIG. 10. The arrows shown in the same figure denote the directions in which the movable member 3 can be displaced.

The invention therefore provides a device affording feed of a movable member along linear, curved or any path in a plane and of any desired configuration in a three-dimensional space.

The improved device is cheaper and simpler over known devices. Moreover, both stresses and weights are balanced.

It will be understood that, the principle of the invention being left unaltered, embodiments and constructional details may be widely varied with respect to the examples described and shown without departing from the scope of this invention. For instance, instead of providing two chains for each carriage as shown throughout the drawing, one chain or more than two chains can be adopted in accordance to practical requirements, or the geometry itself of the carriages may be varied or compounded at will.

Moreover, the chains which have been shown on the drawing as Galle's chains, may be of any desired type, such as chains articulating in two orthogonal planes through any desired angle. The supporting device may be assembled in a raised position with respect to the path, plane or volume served, the arrangement of the devices being reversed in this case with respect to the representation on the drawings.

What I claim is:

System for connecting two machine members, one of which is stationary and the other movable along a path and over a plane within a given space, by means of flexible transmissions of electric, pneumatic, hydraulic and like power supply to said movable component of the machine, said system comprising: a movable main supporting structure; at least two equal guides of elongated annular shape arranged on the outer periphery of said structure and lying in two parallel spaced planes, each guide having an upper and a lower run and curved portions connecting the ends of said runs; an identical projection of reverse U-shape on said upper run of each guide arranged in the same plane as said guide, said reverse U-shape projections being independent of the latter and connected therebetween to form an auxiliary supporting structure, an identical chain closed loop form for surrounding each guide slidable thereon and held taut thereby, first stationary rails on both sides of said main supporting structure extending lengthwise of the latter, means for movably supporting said main supporting structure on said rails, cross members arranged between said chains equally spaced and secured to aligned links of the chains, said stationary and movable members being secured to the chain with said stationary member being arranged below and said movable member arranged on the upper run of said guides, at least one flexible transmission of power supply interposed between said stationary and movable members and fastened to said cross-members secured to said chains, a second pair of rails parallel with said first stationary rails arranged at both sides of said auxiliary supporting structure, and supporting means for movably supporting said auxiliary supporting structure on said second pair of rails, whereby said movable member may be displaced over any desired path in the plane of said U-shaped projection without displacing said stationary member.

References Cited in the file of this patent

UNITED STATES PATENTS

| 1,866,681 | Taylor | July 12, 1932 |
| 2,292,425 | Abrahamson | Aug. 11, 1942 |
| 2,864,907 | Waninger | Dec. 16, 1958 |
| 3,024,325 | Waninger | Mar. 6, 1962 |

FOREIGN PATENTS

| 309,871 | Germany | Dec. 20, 1918 |
| 874,209 | Germany | Apr. 20, 1953 |
| 764,349 | Great Britain | Dec. 28, 1956 |